US012156008B2

(12) United States Patent
Ren et al.

(10) Patent No.: US 12,156,008 B2
(45) Date of Patent: Nov. 26, 2024

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 222 days.

(21) Appl. No.: 18/073,582

(22) Filed: Dec. 2, 2022

(65) Prior Publication Data

US 2024/0073613 A1 Feb. 29, 2024

Related U.S. Application Data

(63) Continuation of application No. PCT/CN2022/115649, filed on Aug. 30, 2022.

(51) Int. Cl.
*H04R 9/02* (2006.01)

(52) U.S. Cl.
CPC .................................... *H04R 9/025* (2013.01)

(58) Field of Classification Search
CPC . H04R 9/025; H04R 7/04; H04R 1/24; H04R 9/02; H04R 9/063; H04R 31/006; H04R 1/06
See application file for complete search history.

(56) References Cited

U.S. PATENT DOCUMENTS 8,300,876 B2 * 10/2012 Xu ....................... H04R 31/006 381/431
2005/0254680 A1 * 11/2005 Kitamura ................. H04R 1/06 381/396
2023/0292037 A1 * 9/2023 Xu ........................... H04R 1/24

* cited by examiner

*Primary Examiner* — Angelica M McKinney
(74) *Attorney, Agent, or Firm* — W&G Law Group

(57) ABSTRACT

The present invention provides a coaxial speaker including a frame, a magnetic circuit system, a first vibration system, a second vibration system around the first vibration system, a first circuit board, an inserting member, and a first terminal. The first vibration system locates coaxially with the second vibration system. The first vibration system includes a first diaphragm and a first voice coil. The magnetic circuit system includes a first magnetic gap and a second magnetic gap. The first circuit board is a flat shape and electrically connected to the first voice coil. The first circuit board abuts against a surface of the first voice coil away from the first diaphragm. The arrangement of the first circuit board can increase the amplitude of the first voice coil, and the coaxial speaker can also realize the function of a receiver.

10 Claims, 4 Drawing Sheets

COAXIAL SPEAKER

FIELD OF THE PRESENT INVENTION

The present invention relates to the field of electro-acoustic conversion, and more particularly, to a coaxial speaker.

DESCRIPTION OF RELATED ART

Coaxial speaker refers to the speaker with the integration of the treble unit and bass unit, and the treble unit and bass unit are set coaxially. The sound source of the treble unit and bass unit of the coaxial speaker can be located in front of the coaxial speaker, that is, the two speaker units sounding along a same direction, The sound source of the treble unit and bass unit of the coaxial speaker can also be located in front and back of the coaxial speaker respectively, that is, the two speaker units sounding along different directions.

In related art, the treble unit the coaxial speaker usually locates inside the bass unit of the coaxial speaker. A leading wire of a treble voice coil of the treble unit connects to a terminal directly, and the treble voice coil connects to an external circuit through the terminal. However, during the use of the coaxial speaker, the treble voice coil is only glued and fixed with a treble diaphragm. Due to the lack of support, the vibration of the treble voice coil is relatively unstable. And the leading wire of the treble voice coil is directly welded to the terminal, the performance of the coaxial speaker is unstable due to the easy disconnection from the terminal by pulling.

Therefore, it is desired to provide a new coaxial speaker which can overcome the above problems.

SUMMARY

In view of the above, the embodiment of the present invention provides a new coaxial speaker. By the present invention, the coaxial speaker has a stable structure and can also realize the function of a receiver.

The present invention provides a coaxial speaker including a frame, a magnetic circuit system mounted under the frame, a first vibration system fixed on an inner side of the frame, and a second vibration system fixed on an outer side of the frame and around the first vibration system. The first vibration system locates coaxially with the second vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside the first magnetic gap. The first voice coil at least partially locates into the first magnetic gap. The second voice coil at least partially locates into the second magnetic gap. The coaxial speaker further includes a first circuit board with a flat shape electrically connected to the first voice coil, an inserting member supporting the first circuit board, and a first terminal passing through the inserting member to connect the first circuit board to an external circuit. The first circuit board abuts against a surface of the first voice coil away from the first diaphragm.

As an improvement, the magnetic circuit system includes a magnetic guiding member, the magnetic guiding member including a first bottom wall with a flat shape enclosing a first through hole and a pair of first side walls arranged opposite to each other and formed by bending and extending from the first bottom wall, the first circuit board located between the pair of the first side walls.

As an improvement, the two first side walls are partially set staggered so that part of a projection of one of the two first side walls along a direction perpendicular to a vibration direction of the coaxial speaker falls outside the other first side wall.

As an improvement, the magnetic circuit system includes a first magnet stacked on one side of the first bottom wall proximal to the first diaphragm, a second magnet stacked on the other side of the first bottom wall, and a magnetic bowl supporting the second magnet, the magnetic bowl including a second bottom wall enclosing a second through hole and a second side wall bending and extending from a side of the second bottom wall distal to the second through hole, the first magnetic gap formed between the first magnet and the first side wall of the magnetic guiding member, the second magnetic gap formed between the first magnet, the first bottom wall, the second magnet and the second side wall of the magnetic bowl.

As an improvement, the inserting member extends from the second through hole of the magnetic bowl and passes through the first through hole of the magnetic guiding member and locates between the pair of the first side walls, the first circuit board including a first fixed end stacked on a top of the inserting member, a second fixed end elastically supporting a lower end of the first voice coil, and an elastic connecting portion connecting the first fixed end and the second fixed end.

As an improvement, the first voice coil is in the shape of a rounded rectangle, and the elastic connecting portion of the first circuit board is bent and extended along a long axis direction.

As an improvement, the first circuit board further includes a pad portion disposed on the second fixed end, the pad portion located inside the first voice coil, the first voice coil including a leading wire, and the leading wire welded on the pad portion.

As an improvement, the inserting member includes a first step portion and a second step portion located on the first step portion, the second magnet partially stacked on the first step portion, the first bottom wall of the magnetic guiding member partially stacked on the second step portion.

As an improvement, the coaxial speaker further includes a support shelf and an elastic assembly connecting the second vibration system and the support shelf, the elastic assembly including a second circuit board and a support membrane connected with the second circuit board, the second voice coil electrically connected to the second circuit board.

As an improvement, the magnetic bowl further includes an extension wall bending and extending from an end of the second side wall away from the second bottom wall, the extension wall is fixedly connected with the support shelf.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

Figure 1:
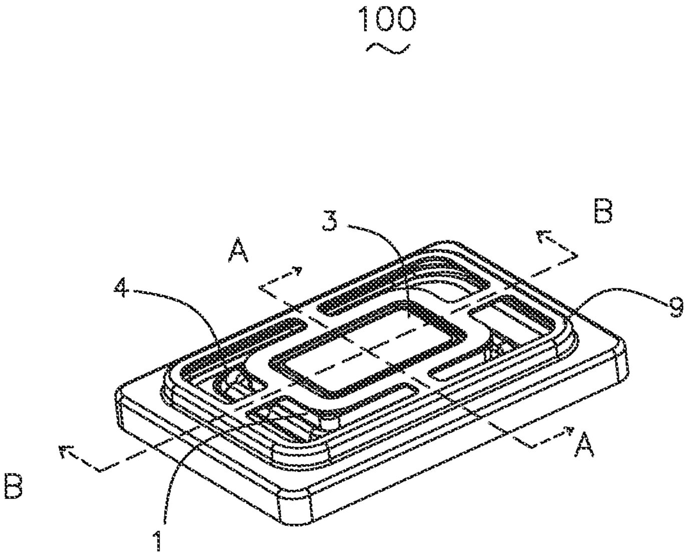
FIG. 1 is an illustrative isometric view of a coaxial speaker in accordance with one embodiment of the present invention.
Figure 2:
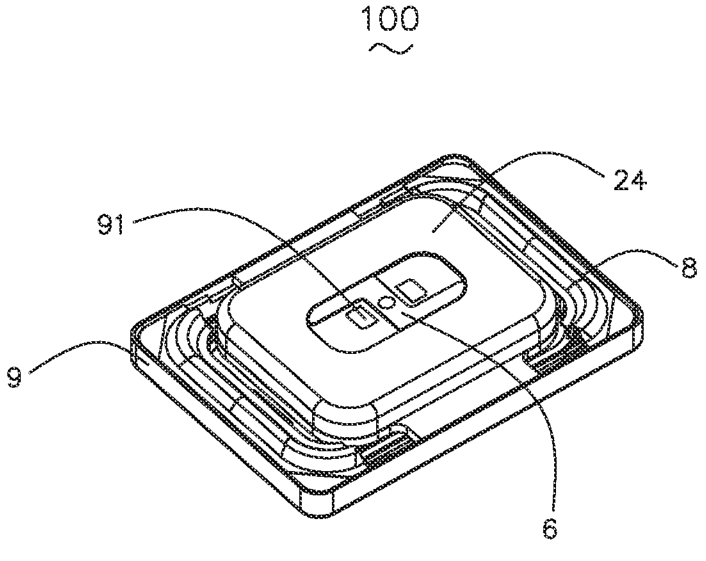
FIG. 2 is an illustrative isometric view of the coaxial speaker from another perspective of FIG. 1.
Figure 3:
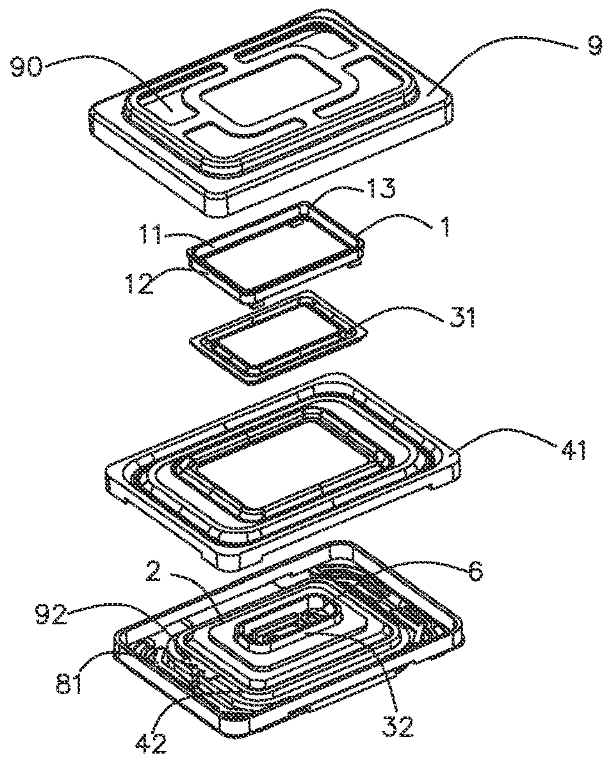
FIG. 3 is a partially exploded view of the coaxial speaker of FIG. 1.
Figure 4:
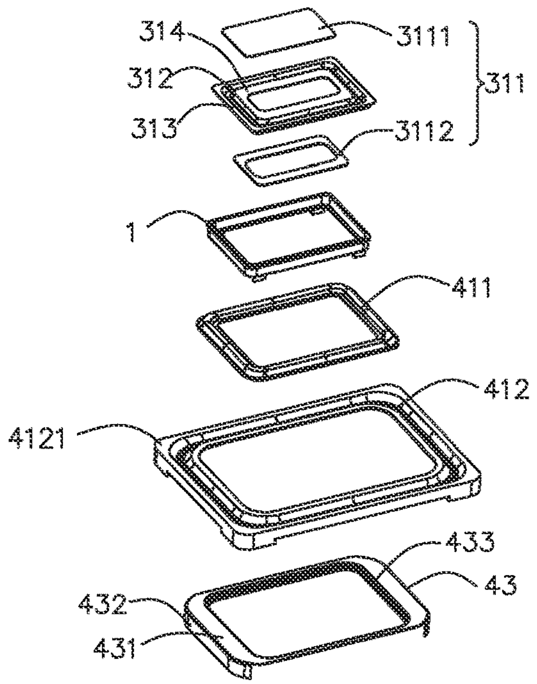
FIG. 4 is an exploded view of partly members of the coaxial speaker of FIG. 1.

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Referring to the FIGS. 1-8, the present invention provides one embodiment of a coaxial speaker 100. The coaxial speaker 100 includes a frame 1, a magnetic circuit system 2 mounted with the frame 1, a first vibration system 3 fixed on an inner side of the frame 1, a second vibration system 4 fixed on an outer side of the frame 1, an inserting member 5, a first circuit board 6 fixed with the inserting member 5, a support shelf 7, an elastic assembly 8, and a cover 9 covering the first vibration system 3 and the second vibration system 4. The second vibration system 4 locates around the first vibration system 3 and is arranged coaxially with the first vibration system 3.

The frame 1 is substantially rectangular, and includes an inner side wall 11, an outer side wall 12 opposite to the inner side wall 11, and a top wall 13 connecting the inner side wall 11 and the outer side wall 12. The first vibration system 3 is fixed to the inner side wall 11 of the frame 1, and the second vibration system 4 is fixed to the outer side wall 12 of the frame 1. The cover 9 partially abuts against the top wall 13.

Figure 5:
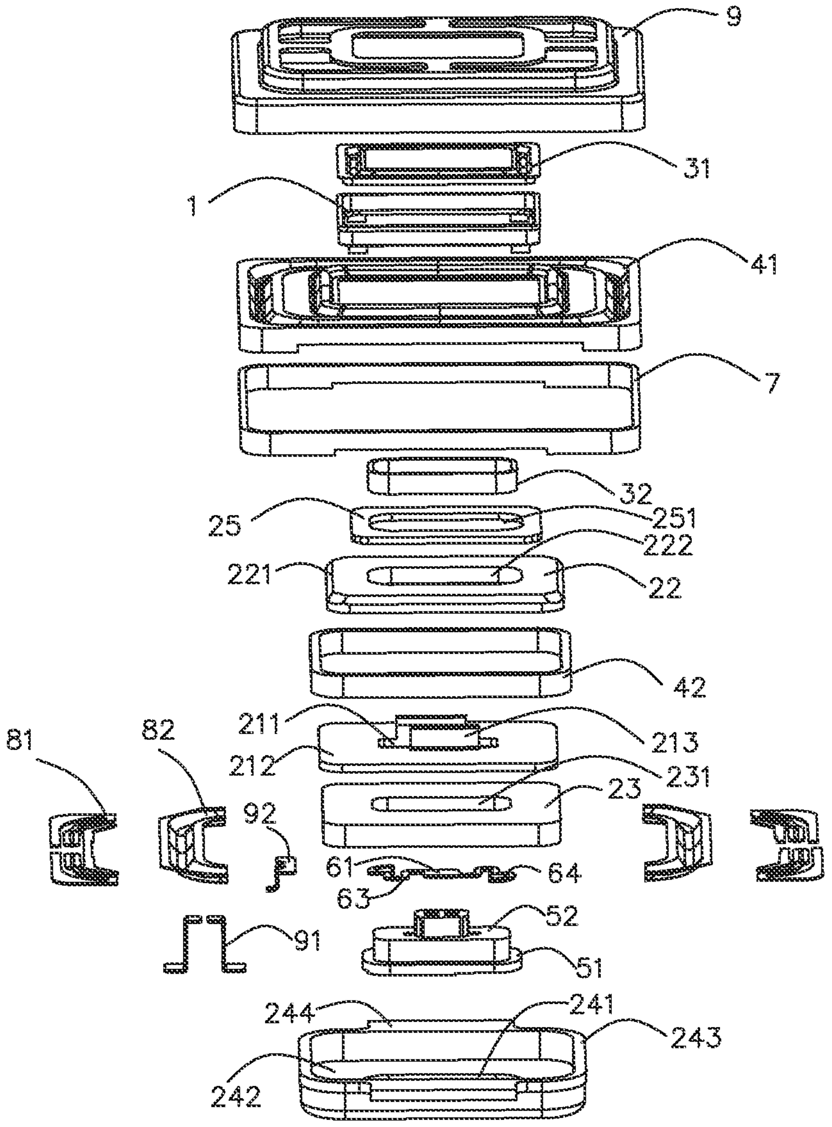
FIG. 5 is an exploded view of the coaxial speaker of FIG. 1.
Figure 6:
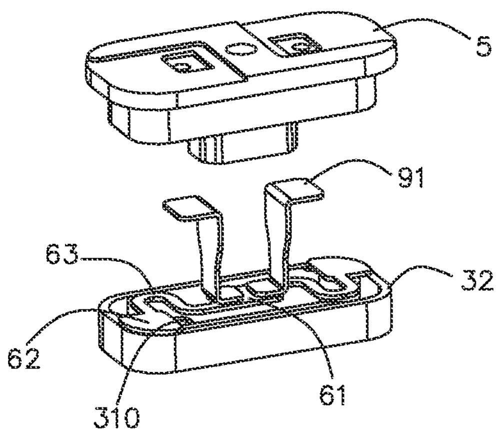
FIG. 6 is another partially exploded view of partly members of the coaxial speaker of FIG. 1.
Figure 7:
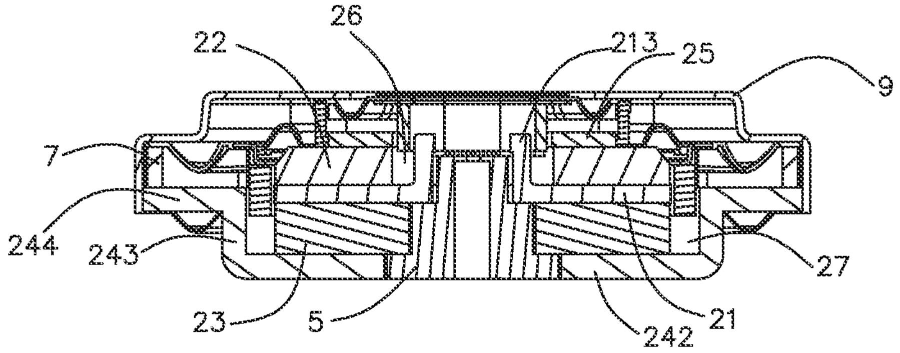
FIG. 7 is an illustrative cross-sectional view of the acoustic device taken along line A-A of FIG. 1.
Figure 8:
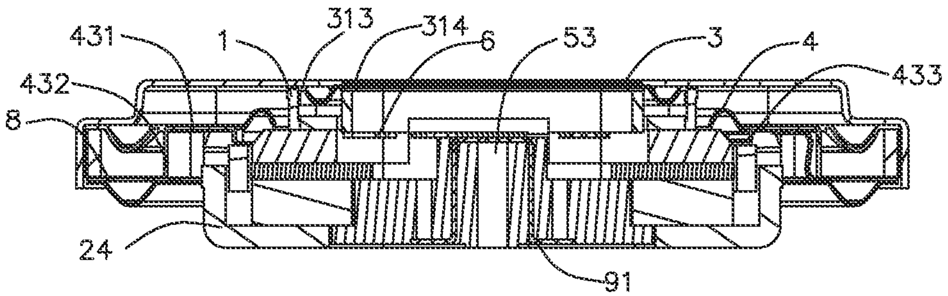
FIG. 8 is an illustrative cross-sectional view of the acoustic device taken along line B-B of FIG. 1.

The magnetic circuit system 2 includes a magnetic guiding member 21, a first magnet 22 disposed on one side of the magnetic guiding member 21, a second magnet 23 disposed on the other side of the magnetic guiding member 21, a magnetic bowl 24 supporting the second magnet 23, and a pole plate 25 covering on the first magnet 22. The magnetic guiding member 21 includes a first bottom wall 212 with a flat shape enclosing a first through hole 211 and a pair of first side walls 213 arranged opposite to each other and formed by bending and extending from the first bottom wall 212. The first circuit board 6 locates between the pair of the first side walls 213. Referring to FIG. 5, the two first side walls 213 are partially set staggered so that part of a projection of one of the two first side walls 213 along a direction perpendicular to a vibration direction of the coaxial speaker 100 falls outside the other first side wall 213.

The first magnet 22 is stacked on one side of the first bottom wall 212 proximal to the first vibration system 3, and the second magnet 23 is stacked on the other side of the first bottom wall 212 distal to the first vibration system 3. The first magnet 22 is arranged coaxially with and faced to the second magnet 23. The first magnet 22 and the second magnet 23 are magnetized along a vibration direction of the coaxial speaker 100, and the first magnet 22 and second magnet 23 are set opposite each other with a same pole, that is, the first magnet 221 and the second magnet 231 are magnetized in opposite directions. The first magnet 22 includes a cutting surface 221 disposed on a surface of the first magnet 22 closed to the second vibration system 4. The first magnet 22 has a first perforation 222, and the second magnet 23 has a second perforation 231. The first side wall 213 extends into the first perforation 222.

A lower surface of the magnetic bowl 24 is flush with the lower surface of the inserting member 5. The magnetic bowl 24 includes a second bottom wall 242 enclosing a second through hole 241, a second side wall 243 bending and extending from a side of the second bottom wall 242 distal to the second through hole 241, and an extension wall 244 bending and extending from an end of the second side wall 243 away from the second bottom wall 242. The extension wall 244 is fixedly connected with the support shelf 7. The first magnet 22 stacking with the pole plate 25 and spaced apart from the first side wall 213 of the magnetic guiding member 21 to form a first magnetic gap 26. The first magnet 22 stacking with the first bottom wall 212 and the second magnet 23, and spaced apart from the second side wall 243 of the magnetic bowl 24 to form a second magnetic gap 27. The second magnetic gap 27 locates outside the first magnetic gap 26.

The pole plate 25 has a third perforation 251, and the first side wall 213 further extends into the third perforation 251.

The first vibration system 3 includes a first diaphragm 31 and a first voice coil 32 driving the first diaphragm 31 to generate sounds. The first voice coil 32 is in the shape of a rounded rectangle. The first voice coil 32 at least partially locates into the first magnetic gap 26. The first voice coil 32 includes a leading wire 310. The first diaphragm 31 can be used for treble sounding, and also can be used for a receiver. A sound direction of the first diaphragm 31 is upward along the vibration direction.

The first diaphragm 31 includes a first dome 311 and a first suspension 312 surrounding the first dome 311. The first dome 311 includes a first dome portion 3111 located above the first suspension 312 and a second dome portion 3112 located below the first suspension 312. The first dome portion 3111 is a plate shape structure, and the second dome portion 3112 is a hollow annular structure. The first suspension 312 is also a hollow annular structure, and the first suspension 312 is a structure recessing downwardly along the vibration direction. A first fixing portion 313 is formed by extending from an outer edge of the first suspension 312, and a second fixing portion 314 is formed by extending from an inner edge of the first suspension 312. The first fixing portion 313 is attached and fixed to the top wall 13 and part of the inner side wall 11 of the frame 1, and a portion of the first fixing portion 313 attached to the top wall 13 is sandwiched between the top wall 13 and the cover 9. The first dome portion 3111 is attached to an upper surface of the second fixing portion 314, and the second dome portion 3112 is attached to a lower surface of the second fixing portion 314. The second dome portion 3112 is sandwiched between the second fixing portion 314 and the first voice coil 32.

The second vibration system 4 includes a second diaphragm 41, a second voice coil 42 driving the second diaphragm 41 to generate sounds, and a voice coil support 43 connecting the second diaphragm 41 to second voice coil 42. The second voice coil 42 is in the shape of a rounded rectangle. The second voice coil 42 at least partially locates into the second magnetic gap 27. The second diaphragm 41 can be used for bass sounding, and the sound direction of the second diaphragm 41 is upward along the vibration direction. The second diaphragm 41 includes a second suspension 411, a third suspension 412 surrounding the second suspension 411 and spaced apart from the second suspension 411. The second suspension 411 and the third suspension 412 are all hollow annular structures. The second suspension 411 is a structure protruding upwardly along the vibration direction, and the third suspension 412 is a structure recessing downwardly along the vibration direction. The voice coil support 43 connects the second suspension 411, the third suspension 412, and the second voice coil 42. An end of the second suspension 411 proximal to the first diaphragm 31 is fixed to the outer side wall 12 of the frame 1, or/and to the first magnet 22. The third suspension 412 includes a third fixing portion 4121.

The inserting member 5 extends from the second through hole 241 of the magnetic bowl 24 and passes through the first through hole 211 of the magnetic guiding member 21 and locates between the pair of the first side walls 213. The inserting member 5 includes a first step portion 51 and a second step portion 52 located on the first step portion 51. The second magnet 23 partially stacked on the first step portion 51, the first bottom wall 212 of the magnetic guiding member 21 partially stacked on the second step portion 52. A first terminal 91 is provided passing through the inserting member 5 to connect the first circuit board 6 to an external circuit. The first terminal 91 is connected with the first circuit board 6. The first voice coil 32 is electrically connected to the first circuit board 6 through the first terminal 91. A leakage channel 53 is provided passing through the inserting member 5.

The first circuit board 6 is supported and fixed on the inserting member 5, and first circuit board 6 abuts against a surface of the first voice coil 32 away from the first diaphragm 31. The first circuit board 6 includes a first fixed end 61 stacked on a top of the inserting member 5, a second fixed end 62 elastically supporting a lower end of the first voice coil 32, an elastic connecting portion 63 connecting the first fixed end 61 and the second fixed end 62, and a pad portion 64 disposed on the second fixed end 62. The pad portion 64 locates inside the first voice coil 32. The leading wire 310 of the first voice coil 32 is welded on the pad portion 64. The elastic connecting portion 63 of the first circuit board 6 extends in a continuous S-shape along a long axis direction to increase a length of an elastic arm of the first circuit board 6. The first circuit board 6 elastically supports the first voice coil 32, and due to the S-shape elastic connecting portion 63, the first circuit board 6 increases an amplitude of the first voice coil 32. The two first side walls 213 are partially set staggered so that an outer side of the first side walls 213 can form a space for avoiding the elastic connecting portion 63.

The support shelf 7 is an annular steel ring, and the third fixing portion 4121 of the third suspension 412 is fixedly connected to the support shelf 7. Specifically, the third fixing portion 4121 covers an upper surface and part of a side surface of the support shelf 7.

The elastic assembly 8 connects the voice coil support 43 and the support shelf 7. The elastic assembly 8 includes a second circuit board 81 and a support membrane 82 connected with the second circuit board 81. The second voice coil 42 is electrically connected to the second circuit board 81. Specifically, the coaxial speaker 100 further includes a second terminal 92 connected to the second circuit board 81, and the second voice coil 42 is electrically connected to the second circuit board 81 through the second terminal 92. In this embodiment, the number of the elastic assemblies 8 is two, and each elastic assembly 8 is arranged in a direction of a short axis of the coaxial speaker 100. In other embodiments, the position of the elastic assembly 8 may be determined according to the situation.

The voice coil support 43 includes a flat portion 431, a first extending portion 432 bending and extending from one end of the flat portion 431 to the second circuit board 81 and connected to the second circuit board 81, and a second extending portion 433 bending and extending from the other end of the flat portion 431 to the second voice coil 42 and connected to the second voice coil 42. One end of the flat portion 431 is connected with the second suspension 411, and the other end of the flat portion 431 is connected with the third suspension 412.

A sound-passing hole 90 is provided through the cover 9 for transmitting the sound generated by the first diaphragm 31 and the second diaphragm 41.

Comparing with the related art, in the coaxial speaker of present invention, the coaxial speaker including a frame, a magnetic circuit system mounted under the frame, a first vibration system fixed on an inner side of the frame, and a second vibration system fixed on an outer side of the frame and around the first vibration system. The first vibration system locates coaxially with the second vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside the first magnetic gap. The first voice coil at least partially locates into the first magnetic gap. The second voice coil at least partially locates into the second magnetic gap. The coaxial speaker further includes a first circuit board with a flat shape electrically connected to the first voice coil, an inserting member supporting the first circuit board, and a first terminal passing through the inserting member to connect the first circuit board to an external circuit. The first circuit board abuts against a surface of the first voice coil away from the first diaphragm. The coaxial speaker of the present invention arranges an annular bass vibration system for providing bass sounding, a treble vibration system disposed surrounded by the bass vibration system for providing treble sounding. Bass sounding and treble sounding form a full-range speaker, providing high-quality sound. At the same time, due to the design of the flat-shaped first circuit board, the first diaphragm can be further supported, and the amplitude of the first diaphragm is increased, and the first vibration system can also be used as the receiver, realizing the expansion of multiple uses of a device.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a frame;

a magnetic circuit system mounted under the frame, the magnetic circuit system comprising a first magnetic gap and a second magnetic gap located outside the first magnetic gap;

a first vibration system fixed on an inner side of the frame, the first vibration system comprising a first diaphragm and a first voice coil driving the first diaphragm to generate sounds, the first voice coil at least partially located into the first magnetic gap; and a second vibration system fixed on an outer side of the frame and around the first vibration system, the first vibration system located coaxially with the second vibration system, the second vibration system comprising a second diaphragm and a second voice coil driving the second diaphragm to generate sounds, the second voice coil at least partially located into the second magnetic gap;

a first circuit board with a flat shape electrically connected to the first voice coil, the first circuit board abutting against a surface of the first voice coil away from the first diaphragm;

an inserting member supporting the first circuit board;

a first terminal passing through the inserting member to connect the first circuit board to an external circuit.

2. The coaxial speaker as described in claim 1, wherein the magnetic circuit system comprises a magnetic guiding member, the magnetic guiding member comprising a first bottom wall with a flat shape enclosing a first through hole and a pair of first side walls arranged opposite to each other and formed by bending and extending from the first bottom wall, the first circuit board located between the pair of the first side walls.

3. The coaxial speaker as described in claim 2, wherein the two first side walls are partially set staggered so that part of a projection of one of the two first side walls along a direction perpendicular to a vibration direction of the coaxial speaker falls outside the other first side wall.

4. The coaxial speaker as described in claim 2, wherein the magnetic circuit system comprises a first magnet stacked on one side of the first bottom wall proximal to the first diaphragm, a second magnet stacked on the other side of the first bottom wall, and a magnetic bowl supporting the second magnet, the magnetic bowl comprising a second bottom wall enclosing a second through hole and a second side wall bending and extending from a side of the second bottom wall distal to the second through hole, the first magnetic gap formed between the first magnet and the first side wall of the magnetic guiding member, the second magnetic gap formed between the first magnet, the first bottom wall, the second magnet and the second side wall of the magnetic bowl.

5. The coaxial speaker as described in claim 4, wherein the inserting member extends from the second through hole of the magnetic bowl and passes through the first through hole of the magnetic guiding member and locates between the pair of the first side walls, the first circuit board comprising a first fixed end stacked on a top of the inserting member, a second fixed end elastically supporting a lower end of the first voice coil, and an elastic connecting portion connecting the first fixed end and the second fixed end.

6. The coaxial speaker as described in claim 5, wherein the first voice coil is in the shape of a rounded rectangle, and the elastic connecting portion of the first circuit board is bent and extended along a long axis direction.

7. The coaxial speaker as described in claim 6, wherein the first circuit board further comprises a pad portion disposed on the second fixed end, the pad portion located inside the first voice coil, the first voice coil comprising a leading wire, and the leading wire welded on the pad portion.

8. The coaxial speaker as described in claim 4, wherein the inserting member comprises a first step portion and a second step portion located on the first step portion, the second magnet partially stacked on the first step portion, the first bottom wall of the magnetic guiding member partially stacked on the second step portion.

9. The coaxial speaker as described in claim 4, wherein the coaxial speaker further comprises a support shelf and an elastic assembly connecting the second vibration system and the support shelf, the elastic assembly comprising a second circuit board and a support membrane connected with the second circuit board, the second voice coil electrically connected to the second circuit board.

10. The coaxial speaker as described in claim 9, wherein the magnetic bowl further comprises an extension wall bending and extending from an end of the second side wall away from the second bottom wall, and the extension wall is fixedly connected with the support shelf.

* * * * *